US00RE34202E

United States Patent [19]

Kautz

[11] E Patent Number: Re. 34,202

[45] Reissued Date of Patent: Mar. 30, 1993

[54] DUAL MODE PNEUMATIC CONTROL SYSTEM

[75] Inventor: Thomas O. Kautz, Mequon, Wis.

[73] Assignee: Johnson Service Company, Milwaukee, Wis.

[21] Appl. No.: 871,941

[22] Filed: Apr. 21, 1992

Related U.S. Patent Documents

Reissue of:

[64] Patent No.: 4,953,578
Issued: Sep. 4, 1990
Appl. No.: 430,716
Filed: Nov. 2, 1989

[51] Int. Cl.[5] ..... G05D 16/00

[52] U.S. Cl. ..... 137/14; 137/84; 251/26

[58] Field of Search ..... 137/82, 84, 85, 86, 137/599, 900; 251/26

[56] References Cited

U.S. PATENT DOCUMENTS 2,749,927 6/1956 Grogan .
2,773,506 12/1956 Bauer .
2,805,678 9/1957 Panich .
2,939,472 6/1960 Eller .
3,056,417 10/1962 Greaves .
3,227,311 1/1966 Rowell .
3,282,552 11/1966 Sommese, Sr. .
3,433,239 3/1969 Jaquith et al. .
3,529,802 9/1970 Hall .
3,823,725 7/1974 Akiyama et al. .
4,153,068 5/1979 Yoshida .
4,199,006 4/1980 Thalhamer .
4,290,441 9/1981 Scott et al. .
4,561,470 12/1985 Bezard et al. .

OTHER PUBLICATIONS

Control Engineering, vol. 18, No. 8, Aug. 1971, New York, U.S.A. pp. 48-51, P. S. Buckley, Designing Override and Feedforward Controls.

*Primary Examiner*—Alan Cohan
*Attorney, Agent, or Firm*—Foley & Lardner

[57] ABSTRACT

This invention relates to a pneumatic control device having an operating mode selecting means for operating in either the manual or automatic modes. Pneumatic pressure is regulated in the manual mode by a hand operated leakport, and in the automatic mode by a voice coil or other pressure regulating device. The pneumatic input supply, manual pressure regulating means and voice coil all communicate at a common surface. The mode selecting means slides across this common surface to connect together the pneumatic input supply with one of the selected pressure regulating means.

17 Claims, 8 Drawing Sheets

DUAL MODE PNEUMATIC CONTROL SYSTEM

Matter enclosed in heavy brackets [ ] appears in the original patent but forms no part of this reissue specification; matter printed in italics indicates the additions made by reissue.

BACKGROUND OF THE INVENTION

Pneumatic control systems for electropneumatic transducers and other pneumatically operated devices are widely used in industrial processes and automated plants. Pneumatically operated HVAC control systems, due to the nature of building construction in which they are incorporated, present special installation and servicing problems. Typically, these control systems are not installed until construction is at least well under way, or completed. The control panels are usually installed first. Next, wiring is strung, pneumatic actuators are installed on the valves and dampers, and the pneumatic lines are "tubed." Finally, electronic controls for the HVAC system are installed.

During the construction and installation stages, which can be prolonged, some temporary means of HVAC operation is needed. Until the permanent system is fully installed, it cannot be used to position the pneumatically actuated valves and dampers. Also, the repair or replacement of a finally installed transducer or control device unavoidably disrupts the pneumatic supply.

Presently, construction workers and HVAC system installers and servicemen deal with these problems by "jerry-rigging" pneumatic control devices, a practice which can be time consuming, expensive and unreliable. Even after complete installation of the system, a sensing or other electronic problem can render the system inoperative. Repair of the electronic control system may even require disassembly of the pneumatic system.

SUMMARY OF THE INVENTION

Accordingly, this invention meets the need for a manually operated, pneumatic control module and system capable of temporarily substituting for, or overriding, a permanent control system. A suitable override module can serve as a termination point for the pneumatic lines, and provide a means for the manual control of output pneumatic pressure.

The permanent control module used with the module of this invention includes a pressure regulating voice coil and the associated electronic sensors and circuitry needed to operate the coil. In normal operation, the voice coil controls the pneumatic pressure provided to an activator. If the voice coil is opened, pneumatic fluid is bled from the input line supplying the module. In such a case, the operating pressure threshold level of the system is not reached. Accordingly, the pneumatic output of the module cannot provide an actuating pneumatic output for the transducers or other HVAC components connected to the output actuator line.

If the voice coil cannot so function to control the operation of the HVAC system, because it is not completely installed or is malfunctioning, this pneumatic control function is performed by manual operation of the override module. Electronic control signals are not needed for this manual operation mode. Also, a defective or malfunctioning permanent control module can be replaced, or other repairs made, by use of the manual mode provided by the override module, without disrupting the pneumatic supply.

The module may incorporate or cooperate with various control devices, including the diaphragm-type relay described in Holloway et al U.S. Pat. No. 4,207,914. Fluid relays such as described in this and other patents can serve as volume and/or pressure amplifiers. The teachings of this patent are, accordingly, incorporated by reference into this application.

The system of this invention also utilizes a novel mode selection mechanism. Only one O-ring and one moving part are required to switch manually between the automatic and manual modes. The module incorporating the elements of this invention has a common exterior surface on which are located orifices respectively communicating with the input supply pressure, the voice coil supply pressure and the manual switch supply pressure.

A slidable elongated element carrying an O-ring slides across this common surface. The O-ring is carried on the face of the slidable element facing the common orifice-containing surface. The O-ring, due to its size and configuration, pneumatically vents input or supply pneumatic pressure either to the voice coil or to the manually operated pressure control valve. The sliding element and O-ring are so constructed and located, however, that only one of these pneumatic connections can be made at one time (a break before make connection).

It is an object of this invention, therefore, to provide a manually operated pneumatic control module and system capable of maintaining the pressure in a pneumatic system.

It is another object of the invention to provide a method for manually operating an HVAC or other pneumatic-operated system, without the need for electronic control circuitry.

It is a further object of the invention to provide a low cost, easily operated pneumatic control module that permits the selection of either the automatic or the manual mode of operation.

It is still another object of the invention to provide a simply constructed, compact and inexpensive control module containing both pneumatic pressure relaying and pressure adjusting means.

It is a further object of the invention to provide a simply constructed mode switching device, using a minimum of parts.

It is still a further object of the invention to provide a pneumatic system by which HVAC actuator pressure can be provided by operation either of a voice coil pneumatic switching means or a manually operated pressure regulator.

It is a still further object of the invention to provide a simply constructed, manually operated mode switching means for a pneumatic pressure control system.

These and other objects of the invention are achieved by the combination of multiple functions in a single, simply constructed module, as is explained in detail below.

BRIEF DESCRIPTION OF THE DRAWINGS

FIG. 4 (b) is an exploded perspective view of one practical embodiment of the module and other components of the invention as seen from above the module.

DETAILED DESCRIPTION OF THE PREFERRED EMBODIMENTS

Figure 1:
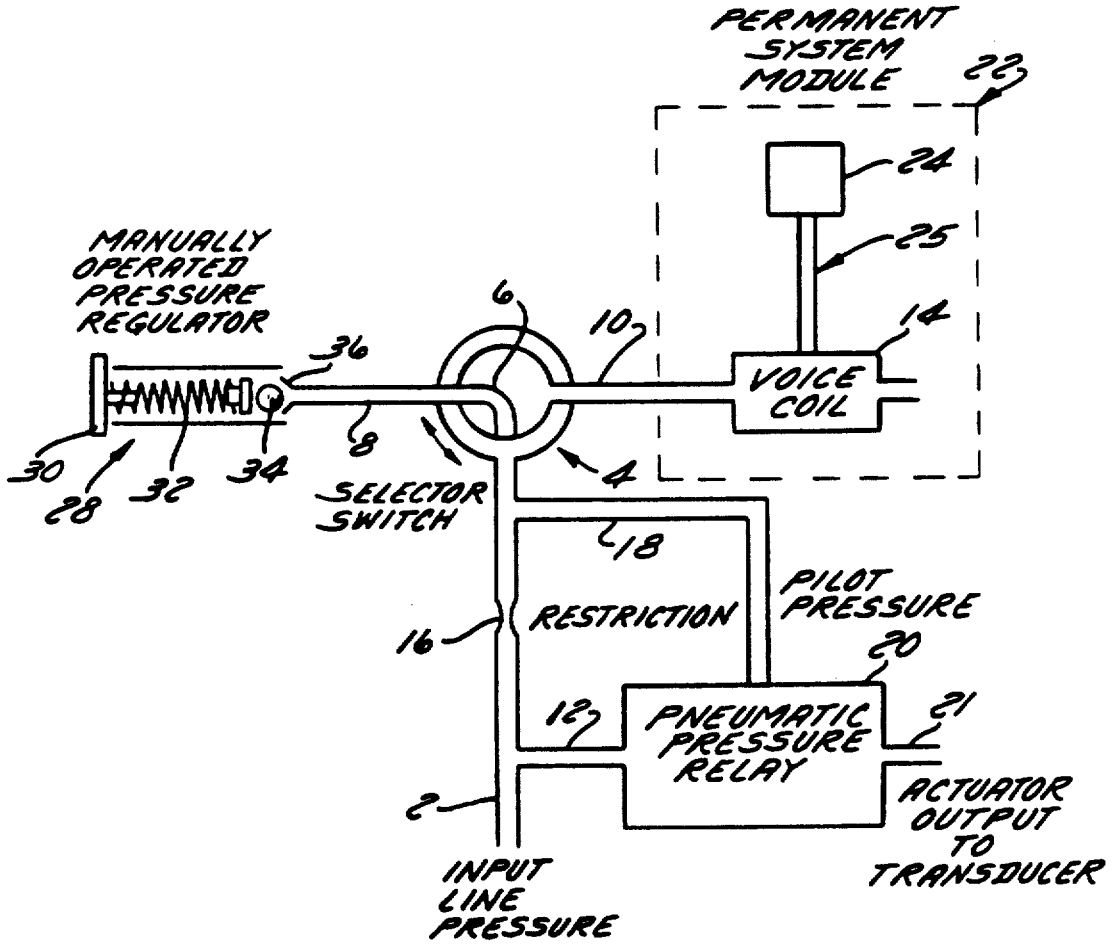
FIG. 1 is a schematic view of the pneumatic system and its components, constituting this invention.
Figure 4A:
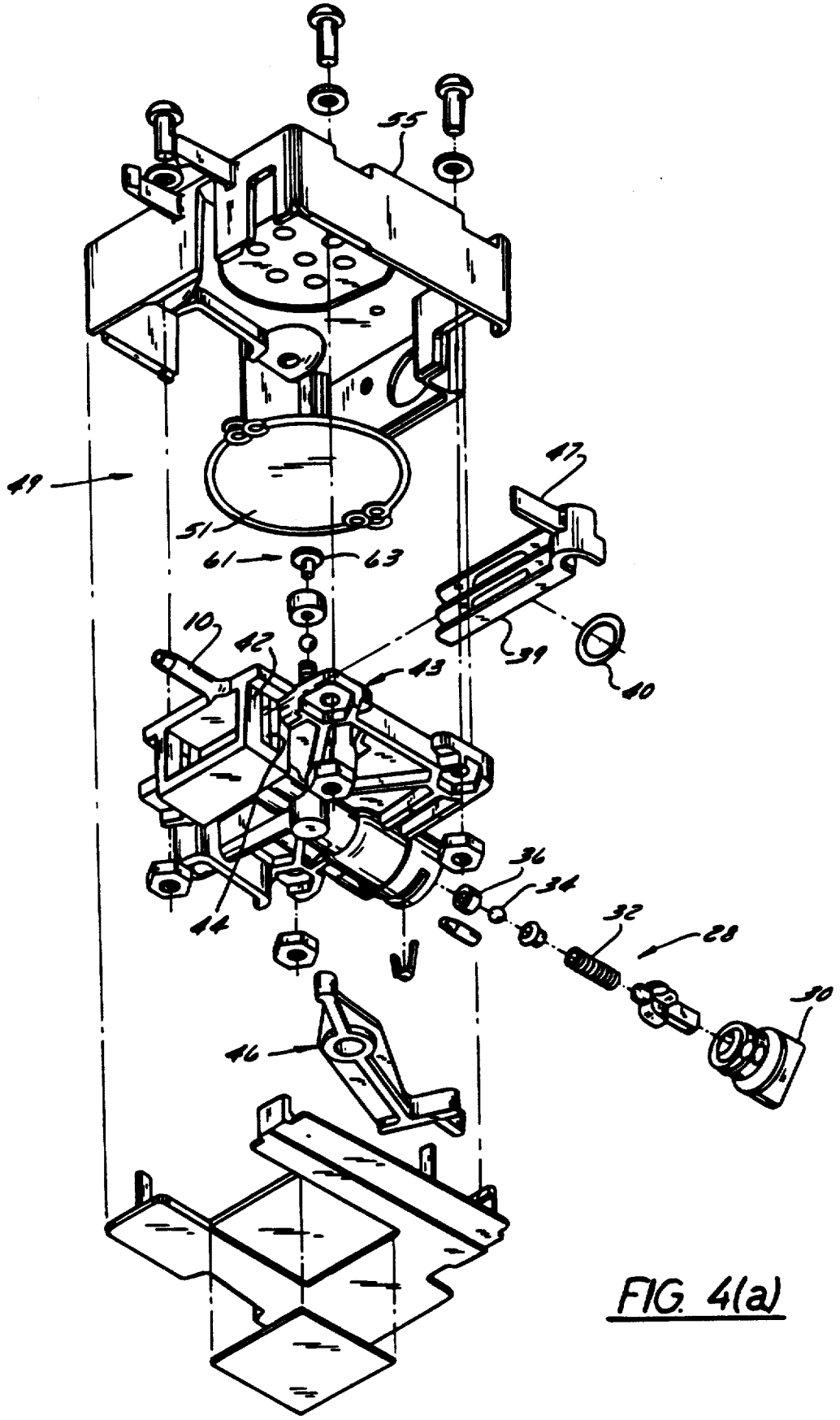
FIG. 4 (a) is an exploded perspective view, of one practical embodiment of the module and other components of this invention as seen from below.
Figure 5:
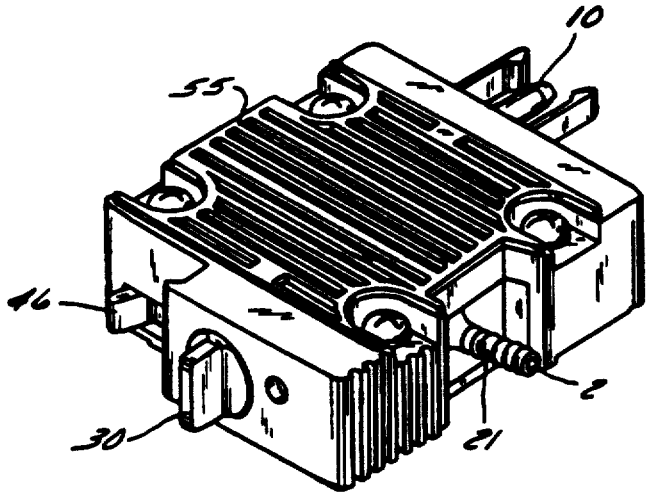
FIG. 5 is a perspective view of a commercial embodiment of the assembled module, containing therein the components of the invention.
Figure 7:
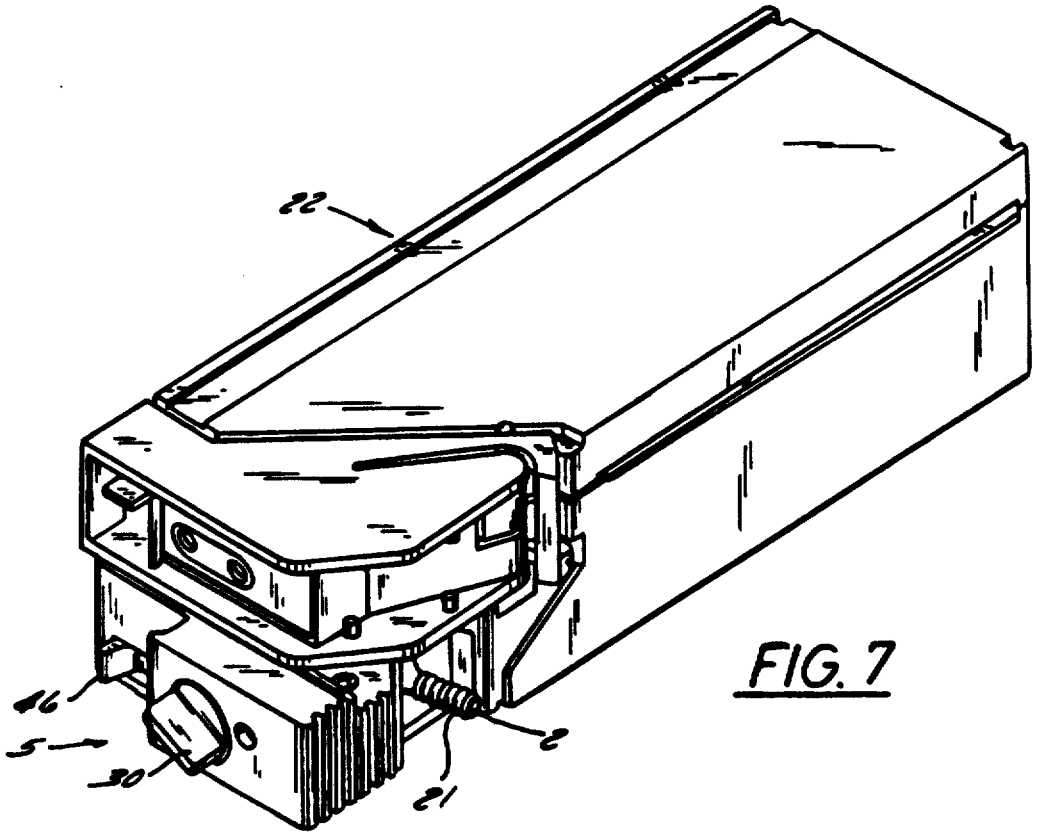
FIG. 7 illustrates in perspective view the module of this invention and it appears plugged into the permanent control module.

Referring to FIG. 1, input pressure line 2 provides a pneumatic input from a (non-illustrated) source, as is conventional in HVAC pneumatic systems. Line 2 is connected to switch 4. The actual construction of switch 4 is illustrated in FIG. 4(a) and (b). The module of this invention functions as a plug-in unit for supplementing or overriding the actual operating module when the latter is under repair or before it is installed. The plug-in unit is illustrated in FIGS. 5 and 7, where it is operatively connected into pneumatic module 22. Its schematic depiction in FIG. 1 is only for purposes of explaining its function.

The inner rotatable elbow 6 of switch 4 selectively supplies pneumatic fluid to pneumatic line 8 or line 10. This switch is hand rotatable, for operation by an HVAC system installer or a serviceman working on an installed system. In the automatic operating mode, the switch 4 would be rotated to the position in which line 10 is supplied. For ordinary HVAC operation, the switch 6 would remain in this position unattended.

Input pressure from line 2 is selectively bled from the system by line 10, pneumatically communicating with voice coil 14. If voice coil 14 is opened to allow the escape of pneumatic fluid, all of the pneumatic fluid is bled through line 10, with no pilot pressure entering pneumatic pressure relay 20 through line 18. Line 12 provides input pneumatic pressure to pneumatic pressure relay 20.

If the voice coil is closed, however, the pneumatic pressure in line 2 will be applied to relay 20 through line 18. In this way, the voice coil can function as an on-off switch. If the relay receives pneumatic pressure of at least a threshold level, the relay will, in turn, provide pneumatic pressure for the operation of electropneumatic transducers or other system elements. Otherwise, it will not provide a pneumatic output.

The permanent system module 22 is illustrated in dotted lines in FIG. 1. It includes pneumatic line 10 and voice coil 14. Electronic controls 24, of standard design, also part of the permanent system module, are connected thereto by signal lines 25, for operating the voice coil. Controls 24 monitor environmental parameters important in the operation of an HVAC system, such as temperature and humidity. Control signals responsive to these monitored parameters regulate the movement of the voice coil.

Mode selector switch 4 can be manually rotated to establish communication between input pressure lines 2 and 8. This manual selection removes any communication between lines 2 and 10, and places the system in the manual mode.

During normal operation of the system, this mode would not be selected. It is useful in operating the system, however, before the automatic system is completely installed or when the automatic system is being repaired.

In the manual mode, input pressure is regulated by manually operated pressure regulator 28. This hand operated regulator performs the same functions as does voice coil 14, communicating with pneumatic pressure relay 20 through lines 8 and 18. The turning of control knob 30 actuates the manual mode. This turning compresses spring 32 against pressure control ball 34. This pressure against the control ball positions it within the seat 36, thereby closing the pressure regulator against any bleeding of input pneumatic pressure. Thus, pilot pressure is applied through line 18, to the relay 20. When line 8 is bled, however, by the opening of the regulator, pneumatic pressure is not adequate to operate the relay.

The pneumatic pressure relay 20 is of standard design. A suitable volume and/or pressure amplifying relay for incorporation in the above-described system, for example, is illustrated and explained in U.S. Pat. No. 4,207,914, issued on Jun. 17, 1980, and assigned to the assignee of this application.

Figure 2:
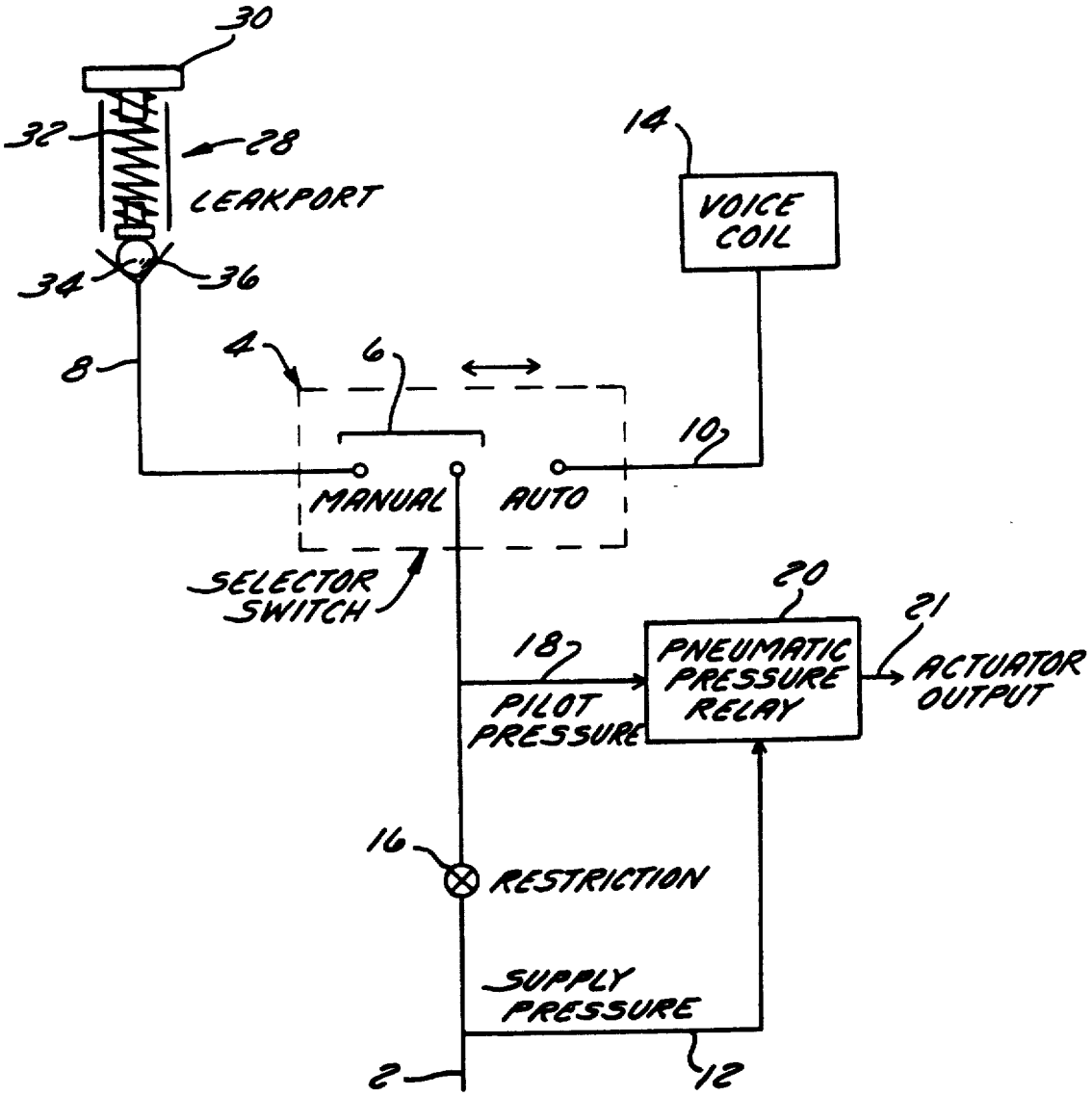
FIG. 2 is a schematic view of the pneumatic system illustrated, in general, in FIG. 1.

FIG. 2 illustrates in schematic form the major components of the pneumatic system described above. The components in this figure are numbered to correspond with those in FIG. 1. Note, however, that the moveable member 6 in the switch of FIG. 2 is slid (not rotated) to switch from one mode to the other. A restriction 16, of about 0.005", is placed in line 2, thereby creating a pilot pressure. An opening of this size has proven satisfactory, although the invention is not limited to this dimension. Minor adaptations, well within the skill of the art, may be used for incorporation in the invention of a particular pressure relay.

Figure 3A:
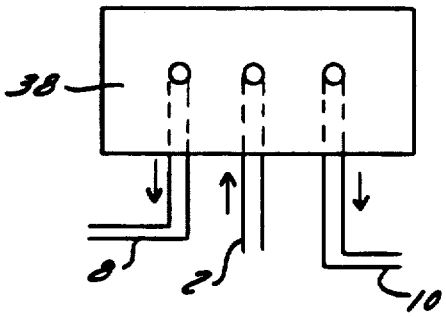
FIGS. 3(a) and (b) schematically show the construction of the selector switch used in this invention.

The construction and operation of the selector switch is shown in FIGS. 3(a) and (b) and 4(a) and (b). The selector switch utilizes a common face or surface 38 (FIG. 3(a)), located on an outside surface of the module. This common surface includes the pressure input line 2, line 8 connected to pressure regulator 28 and line 10 connected to voice coil 14.

Figure 3B:
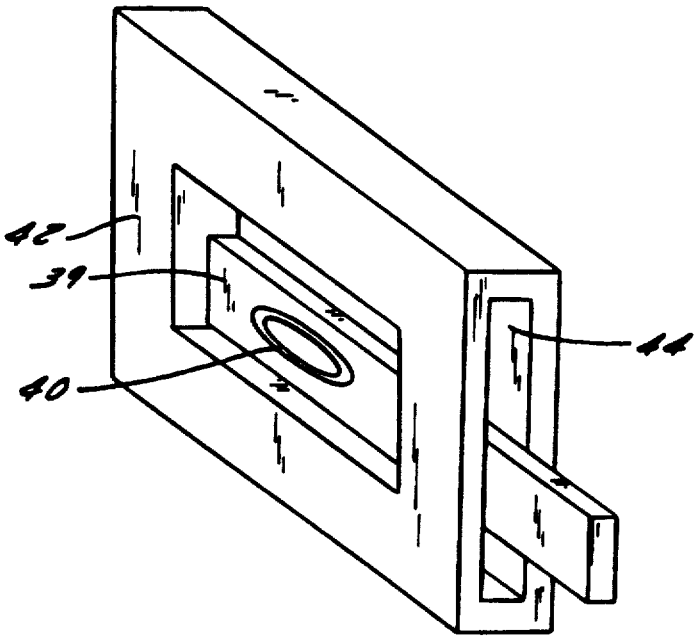

A sliding bar 39, shown in FIGS. 3(b) and 4(a) and (b), carries a sealing O-ring 40 on one face. This O-ring contacts surface 38, as bar 39 slides across this surface. As earlier mentioned, the O-ring is positioned and sized to provide pneumatic continuity between pressure supply 2 and either of pneumatic lines 8 or 10.

Figure 4B:
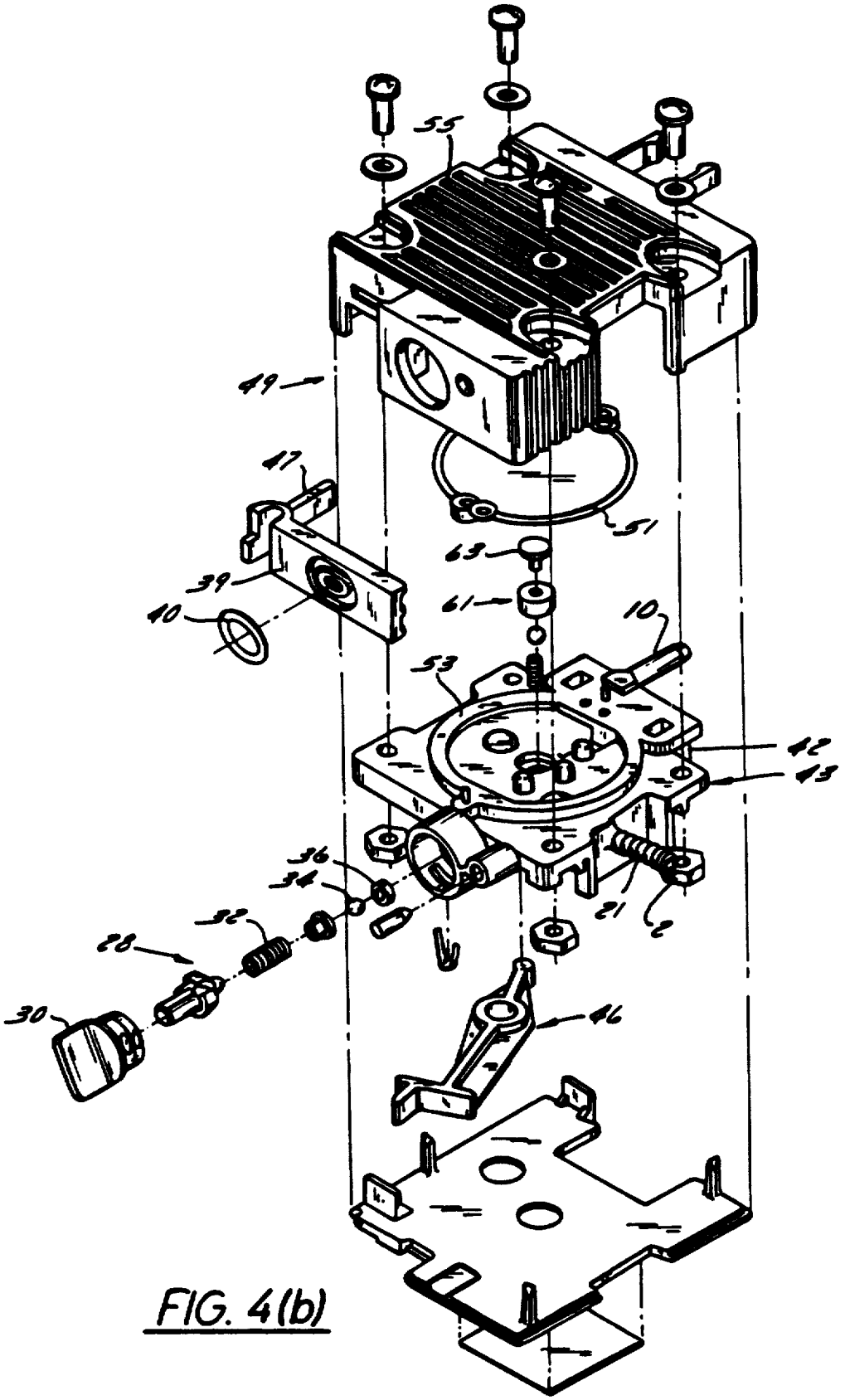

Sliding bar 39 is held within, and supported by, frame body 42. Frame body 42 is fixed to the module body 43 (FIG. 4(b)) to provide manually selective pneumatic coupling. Bar 39 is slid back and forth within a slot 44 in frame body 42 by means of pivotable mode selection switch 46 (shown in FIG. 4) or tab 47. Sliding bar 39 would ordinarily be positioned within frame body 42 by channels, or otherwise, to avoid wobble and insure positive sealing connections. For simplicity of viewing, however, this obvious expedient has not been illustrated.

The exploded view of the invention provided by FIGS. 4(a) and (b) makes evident the assembly and organization of the various components forming the invention. The upper half of the module serves as the fluid relay, noting the correspondence to the components in the fluid relay described in the Holloway patent. It also illustrates the manner in which the invention utilizes a switching means of far simpler design and construction than previously known, to simultaneously provide pressure regulation, mode selection and pressure relaying.

FIGS. 4(a) and (b), 5 and 6(a) to (d) further illustrate the construction of the invention. As depicted by FIG. 5, the various elements constructing the invention are formed in a single module.

In this commercial embodiment, it can be seen that the pneumatic bleed line [12] *10* is connected to the permanent control module. Pneumatic supply line 2 and actuator supply line 21 are not contained with the permanent module, and, therefore, are easily accessible to an installer or repairman. Switch knob 30 and the handle on mode selection switch 46 are similarly accessible.

The module of this invention would preferably be constructed for pneumatic pressure relaying, similarly to the pressure relay module illustrated and described in the Holloway patent. As seen in FIGS. 4(a) and (b), the diaphragm operated relay 49 includes a diaphragm 51 seated on raised circumferential ledge 53. The diaphragm divides the interior chamber of the module into an upper and lower region. This can be clearly seen in the Holloway patent. These two chambers correspond to those above and below the diaphragm 6 in the Holloway patent.

The lower chamber is pneumatically supplied by valve 61 in response to the pressure in the upper chamber. Valve 61 is operated by the movement upwardly or downwardly of plunger 63 within the valve (plunger 28 in the Holloway patent).

Figure 6A:
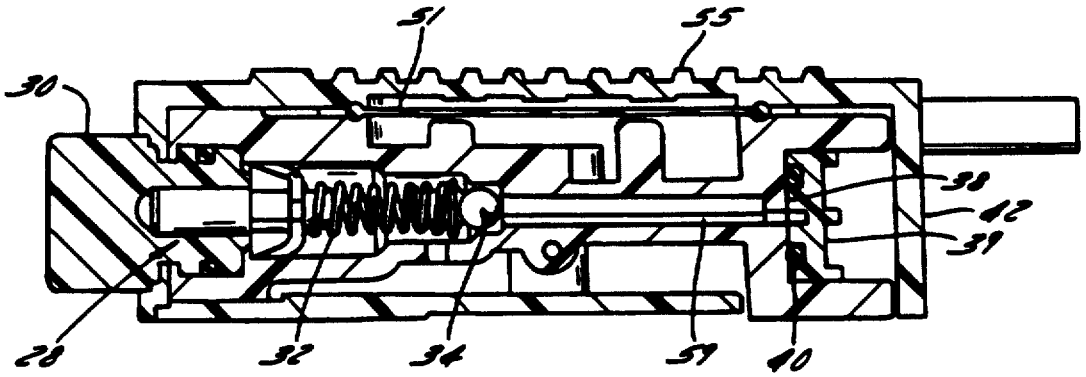
FIGS. 6 (a) to (d) are side plan views of the modules taken at various cross-sections, thereby to show the various pneumatic passages and their locations.

Manually operated pressure regulating valve 28 is seen in FIGS. 4(a) and (b) and 6(a). This valve communicates with mode selection slide 39 through passage 59 (FIG. 6(a)).

Figure 6B:
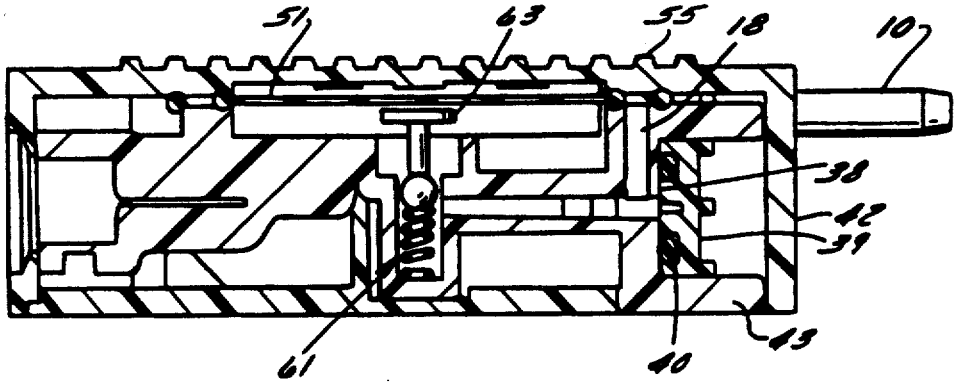

Referring to FIG. 6(b), supply valve 61 is seen to be the equivalent of valve 11 in the relay of the Holloway patent. The top and bottom portions of the module 55 and 43, respectively, can be seen in FIGS. 4(a) and (b) and 6(a), while the upper portion 55 can be seen in FIG. 5. The actuator output 21 is shown in FIG. 5.

Figure 6C:
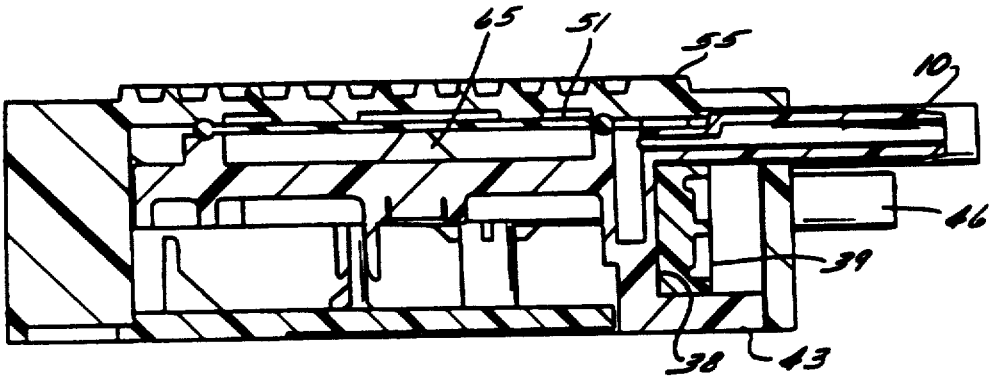
Figure 6D:
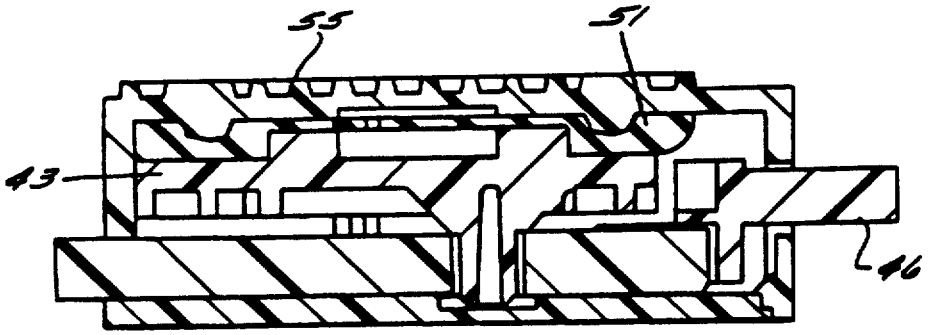

Exhaust seat 31 in the Holloway patent corresponds to conically shaped port 65 in FIG. 6(c), positioned in the lower chamber formed by the diaphragm 51.

Passage 18, seen in FIG. 6(b), allows pilot pressure from the input line 2 to enter the upper pressure relay chamber, where it is balanced against the output pressure in the lower chamber. FIG. 6([d]*b*) illustrates the pneumatic connection [12] *10* to the voice coil [12] *14*.

This invention, therefore, is constructed to incorporate in a single module a pressure relaying stand-by device for a pneumatic system. The Holloway patent describes one such construction of the pressure relaying component, although, quite obviously, others are possible. The simple mode selection mechanism of this invention is suitable for incorporation in any mode selecting module, upon the providing of a common venting or pneumatic connecting surface.

It will be readily apparent to those skilled in this technology that these explanations and drawings will suggest alternative embodiments. These alternatives, along with equivalents of the invention, are, however, deemed to fall within the scope of the invention as claimed. The invention is, of course, equally usable for different pneumatic substances, both fluids and gases. Similarly, the invention has use in applications other than HVAC systems.

What is claimed is:

1. A pneumatic control system, comprising:

input means for supplying pressurized pneumatic fluid to the system;

an operational mode selector for operating the system in a selected operating mode, the selector means being adapted to divert the pneumatic fluid to a flow path within the system associated with the mode selected;

pressure regulating means within each flow path;

a pneumatic relay for receiving pneumatic fluid from the associated flow path and providing a pneumatic fluid output in response to the pressure level of the fluid received; and a module containing the mode selector means, [each] *at least one* pressure regulating means and the pneumatic relay.

2. The system of claim 1, wherein an automatic mode or a manual mode may be selected.

3. The system of claim 2, wherein the pressure regulating means for the manual mode is a manually controlled valve.

4. The system of claim 2, wherein the pressure regulating means for the automatic mode is an electronically controlled voice coil.

5. The system of claim 1, wherein the relay is a pneumatic volume amplifier.

6. The system of claim 1, wherein the fluid input means and each of the pressure regulating means communicate at a common surface.

7. The system of claim 6, wherein the common surface is located on the exterior of the module.

8. The system of claim 7, further including a mode selector means, the mode selector means being slidable along the common surface.

9. The system of claim 8, wherein the mode selector means slides along the common surface to pneumatically direct the input pneumatic fluid either to the manual pressure adjusting means or to an electronically operated pressure control means, depending on the mode selected.

10. The system of claim 8, wherein the mode selector means carries a sealing means for effecting sealing communication either between the input fluid supply means and the manual pressure adjusting means or between the input fluid supply means and the electronically adjusted pressure control means.

11. The system of claim 8, in which the mode selector means includes an O-ring to selectively direct the flow of pneumatic fluid in accordance with the mode selected.

12. The system of claim 1, in which the mode selection means is operated by a lever.

13. The system of claim 1, wherein the system is an HVAC system.

14. The system of claim 1, wherein the operational mode selector is a plug in module for insertion with, and overriding of, the permanent control module.

15. A method for operating an HVAC system, comprising the steps of:

providing pneumatic fluid to the system;

selecting the mode of operation of the system;

diverting the pneumatic fluid to a pathway corresponding to the mode selected;

regulating the pressure of the diverted pneumatic fluid;

supplying the pneumatic fluid to a pressure relay; and providing from the pressure relay an output of pneumatic fluid for operating the components of the HVAC system.

16. The method of claim 15, in which the fluid is diverted to a pathway corresponding to the automatic mode or to a pathway corresponding to the manual mode.

17. The method of claim 16 in which the pressure regulating means in the automatic mode is an electronically operated voice coil and the pressure regulating means in the manual mode is a hand operated leakport valve.

* * * * *